United States Patent
Pugh et al.

(10) Patent No.: US 11,788,602 B2
(45) Date of Patent: *Oct. 17, 2023

(54) DUAL MASS FLYWHEEL COUPLING MEMBER

(71) Applicant: Ford Global Technologies, LLC, Dearborn, MI (US)

(72) Inventors: Andrew Pugh, Basildon (GB); Aaron John Oakley, Chelmsford (GB); Martin Patrick O'Mahony, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,074

(22) Filed: Nov. 9, 2022

(65) Prior Publication Data

US 2023/0073607 A1 Mar. 9, 2023

Related U.S. Application Data (63) Continuation of application No. 17/063,869, filed on Oct. 6, 2020, now Pat. No. 11,525,494.

(51) Int. Cl.
*F16F 15/315* (2006.01)
*F16F 15/133* (2006.01)

(52) U.S. Cl.
CPC ........ *F16F 15/315* (2013.01); *F16F 15/1336* (2013.01)

(58) Field of Classification Search
CPC .. F16F 15/315; F16F 15/1219; F16F 15/1336; F16F 15/13121; F16F 15/131; F16F 15/13135; F02N 15/062; F02N 15/028; F02N 15/027; F02N 2015/61; F02N 11/02; F16D 13/505; F16D 13/40;
(Continued)

(56) References Cited

U.S. PATENT DOCUMENTS 5,398,562 A 3/1995 Muchmore
6,250,446 B1 6/2001 Leite
(Continued)

FOREIGN PATENT DOCUMENTS

DE 10005001 A1 8/2001
DE 102011117359 A1 5/2013
(Continued)

OTHER PUBLICATIONS

EPO Translation of the Description of FR 2845139 A1, Lelasseux, Apr. 2, 2004. (Year: 2022).

*Primary Examiner* — Daniel D Yabut
(74) *Attorney, Agent, or Firm* — Haley Guiliano LLP (57) ABSTRACT

A dual mass flywheel coupling member for selectively coupling a primary mass and a secondary mass of a dual mass flywheel, the coupling member comprising: a central aperture for enabling axial alignment with the primary mass and the secondary mass; at least one resiliently deformable member, the resiliently deformable member comprising a fixing point attachable to the primary mass to rigidly couple one end of the resiliently deformable member to the primary mass; and at least one engagement feature coupled to the coupling member at a point remote from the fixing point, wherein the engagement feature is configured to engage the secondary mass upon deformation of the resiliently deformable member in an installed configuration.

19 Claims, 5 Drawing Sheets

(58) Field of Classification Search
CPC .......... F16D 13/26; F16D 13/24; F16D 13/22; F16D 13/585; F16D 13/583; F16D 13/586; F16D 2013/706; F16D 2013/703; F16D 2065/1364; F16D 2011/006; F16D 11/08; F16D 11/14; F16D 11/06
See application file for complete search history.

(56) References Cited

U.S. PATENT DOCUMENTS

| | | |
|---|---|---|
| 2004/0256191 A1 | 12/2004 | Buckhouse et al. |
| 2010/0071652 A1 | 3/2010 | Almhagen et al. |
| 2012/0085198 A1 | 4/2012 | Partridge et al. |
| 2012/0234131 A1 | 9/2012 | Robinette et al. |
| 2015/0073600 A1 | 3/2015 | Naruse et al. |
| 2017/0355257 A1 | 12/2017 | Lebas |
| 2018/0216677 A1 | 8/2018 | Tamura |

FOREIGN PATENT DOCUMENTS

| | | |
|---|---|---|
| DE | 102014201726 A1 | 8/2015 |
| DE | 102015205885 A1 | 10/2016 |
| DE | 102015009133 A1 | 1/2017 |
| DE | 102015217176 A1 | 3/2017 |
| EP | 2017497 A1 | 1/2009 |
| FR | 2618182 A | 1/1989 |
| FR | 2845139 A1 | 4/2004 |
| WO | WO17108038 A1 | 6/2017 |

301 — Providing a disc comprising: a central aperture for enabling axial alignment of the primary mass and the secondary mass; at least one resiliently deformable member, the resiliently deformable member comprising a fixing point attachable to the primary mass to rigidly couple one end of the resiliently deformable member to the primary mass; and at least one engagement feature coupled to the disc at a point remote from the fixing point, wherein the engagement feature is configured to engage the secondary mass upon deformation of the resiliently deformable member in an installed configuration.

302 — Attaching the disc to a first face of a primary mass of a dual mass flywheel via the fixing point of each of the at least one resiliently deformable members.

303 — Urging a starter motor pinion in a first pinion direction such that it impinges on the protruding portion of the disc, thereby moving a part of the disc in a first disc direction away from the first face of the primary mass and towards a first face of the secondary mass such that the at least one engagement feature engages with the first face of the secondary mass, thereby engaging the primary mass and the secondary mass.

Providing: a disc comprising: a central aperture for enabling axial alignment of the primary mass and the secondary mass; and at least one resiliently deformable member, the resiliently deformable member comprising a fixing point attachable to the primary mass to rigidly couple one end of the resiliently deformable member to the primary mass; at least one engagement member; a starter motor pinion comprising a flange; and a dual mass flywheel comprising a primary mass and a secondary mass, wherein the primary mass comprises one or more channels, each channel for receiving an engagement member.

402

Attaching the disc to a first face of a primary mass of a dual mass flywheel via the fixing point of each of the at least one resiliently deformable members.

403

Urging a starter motor pinion comprising a flange in a first pinion direction such that the flange impinges on the disc, thereby moving a part of the disc in a first direction towards the first face of the primary mass and towards a first face of the secondary mass such that an engagement member is urged in the first direction through a channel of the one or more channels and the engagement member engages with the first face of the secondary mass, thereby engaging the primary mass and the secondary mass

Fig. 5

DUAL MASS FLYWHEEL COUPLING MEMBER

CROSS REFERENCE TO RELATED APPLICATIONS

This application is a continuation of U.S. patent application Ser. No. 17/063,869, filed Oct. 6, 2020, the disclosure of which is hereby incorporated by reference herein in its entirety.

BACKGROUND

The present disclosure relates to a dual mass flywheel coupling member and, more particularly, but not exclusively, to systems and methods related to locking a primary mass and a secondary mass of a dual mass flywheel during the starting of an engine.

SUMMARY

The development of more efficient combustion engines has led to engines that typically deliver more torque and power at low revolutions, when compared to less efficient engines. However, this rise in torque and power increases stress on the drivetrain. One way of reducing stress on the drivetrain is to mitigate the engine torque peaks.

A dual mass flywheel can be used to absorb and smooth the engine torque peaks, thereby reducing stress on the drivetrain. A dual mass flywheel typically comprises a primary flywheel mass and a secondary flywheel mass rotationally coupled to each other by springs. Typically the primary flywheel mass is coupled to the crankshaft of the engine and the outer edge of the primary flywheel mass comprises a ring gear.

In order to start an engine, a starter motor may be used. A starter motor comprises a motor and a pinion gear on an extendable axle. When starting an engine, the axle (and hence the pinion gear) extends towards the ring gear of the primary flywheel mass causing the pinion gear to engage the ring gear. When starting the engine, the starter motor turns the axle and pinion gear, which in turn turns the primary flywheel mass and hence the crankshaft of the engine, thereby starting the engine. Once the engine has started, the axle (and hence pinion gear) retracts so that the pinion gear is no longer engaged with the ring gear.

It is possible to use a centrifugal clutch arrangement to lock the primary mass and the secondary mass of the dual mass flywheel together, e.g., when starting the engine. However, it is difficult to distinguish between the engine start phase when primary and secondary masses should be locked together and the normal engine running phase when the primary and secondary masses should be unlocked. An actively controlled solution, such as one controlled by the engine control unit, can aid with distinguishing between the start phase and the normal engine running phase. However, such a system is complex and expensive.

In view of the foregoing, the present disclosure provides an apparatus, system and method for coupling the primary and secondary masses of a dual mass flywheel together, e.g., during an engine start phase, that is straightforward to implement and is cost effective.

In accordance with a first aspect of the disclosure, there is provided a dual mass flywheel coupling member, e.g., disc, for selectively coupling, e.g., locking together, a primary mass and a secondary mass of a dual mass flywheel, the coupling member comprising: a central aperture for enabling axial alignment of the coupling member with at least one of the primary mass and the secondary mass, at least one resiliently deformable member, the resiliently deformable member comprising a fixing point attachable to the primary mass to rigidly couple the resiliently deformable member, e.g., one end of the resiliently deformable member, to the primary mass, and at least one engagement feature coupled to the coupling member at a point remote from the fixing point, e.g., at another end of the resiliently deformable member, wherein the engagement feature is configured to engage the secondary mass upon deformation of the resiliently deformable member in an installed configuration.

Such a coupling member is relatively simple to make, attach to a dual mass flywheel and operate. In use, the coupling member may be attached to a first face of the primary mass of a dual mass flywheel via one or more fixing points. In use, the primary mass has two opposing faces, an inward face that directly opposes and faces a first face of the secondary mass and an outward face that does not directly oppose and face the first face of the secondary mass. The coupling member may be made of any suitable metal, polymer or composite material. The fixing point may comprise a weld, a rivet and/or any other suitable fixing means.

In use, when a distal end of a starter motor axle or a part of a starter motor pinion engages with the ring gear to start the engine, a part of the starter motor axle or pinion also impinges on a portion of the coupling member. In a first example, where the coupling member is attached to the inward face of the primary mass, the resiliently deformable member is arranged such that the coupling member is broadly flush with the face of the primary mass in a starting position, in an unbiased state. The end of the starter motor axle or part of the starter motor pinion urges at least a part of the coupling member away from the inward face of the primary mass. As the coupling member moves away from the inward face of the primary mass, energy is stored via (e.g., in) the at least one resilient member. In a second example, where the coupling member is attached to the outward face of the primary mass, the at least one resiliently deformable member is arranged such that the coupling member spaced apart from, e.g., in an unbiased state, the outward face of the primary mass in a starting position. The part of the starter motor pinion, optionally a flange of the starter motor pinion, deforms the resiliently deformable member and urges at least a part of the coupling member towards the outward face of the primary mass. In both examples, the movement of the coupling member causes the at least one engagement feature to engage with the first face of the secondary mass of the dual mass flywheel, upon deformation of the resiliently deformable member, e.g., from a neutral (unbiased) state. In the first example, the engagement features are typically proximate the first face of the secondary mass and the movement of the coupling member urges the engagement features to engage with the secondary mass. In the second example, the engagement features are typically urged through (axial) channels in the primary mass and/or the ring gear before engaging with the secondary mass. Once the engagement features of either example engage with the secondary mass, the primary and secondary masses of the dual mass flywheel are coupled, e.g., locked, together, e.g., during the engine start phase. In both examples, when the starter motor axle and pinion are retracted once the engine has started, the resiliently deformable member urges the coupling member to return back to its starting position, thereby disengaging the engagement features and hence the primary and secondary masses of the dual mass flywheel, without the need for active control. In this way, a simple and inexpensive solution is provided that allows the primary and secondary flywheel masses to be engaged during the engine start phase.

The engagement features may comprise any geometric shape, such as a cube, cuboid, cylinder, pyramid, prism or an irregular shape, non-geometric shape or mix of these shapes. The channel in the primary mass or ring gear may comprise a corresponding (mating) shape to the engagement feature. The first face of the secondary mass may comprise a corresponding void or opening for receiving at least a part of the engagement feature.

In some variations, the coupling member may comprise an outer portion having an engagement surface configured to engage an actuator for moving the coupling member, wherein deformation of the resiliently deformable member is caused by actuation of the coupling member in an installed configuration.

In use, the outer portion of the engagement surface may extend beyond an outer edge of the primary flywheel. The actuator may be the starter motor axle or pinion gear, however it could also be a separate actuator. Such a separate actuator could extend and retract at the same time as the starter motor axle.

In some variations, deformation of the resiliently deformable member may cause the engagement feature to be urged away from the secondary mass in an installed configuration. For example, deformation of the resiliently deformable member may cause potential energy to be stored in the resiliently deformable member. The stored potential energy may be used to retract the engagement feature away from the secondary mass, e.g., upon removal of the force imparted by the actuator.

In some variations, at least one of the at least one engagement features may comprise a protrusion for engaging the secondary mass.

The protrusion may comprise any geometric shape, such as a cube, cuboid, cylinder, pyramid, prism or an irregular shape, a non-geometric shape or a mix of these shapes. The first face of the secondary mass may comprise a corresponding void or opening for receiving the protrusion.

In some variations, at least one of the at least one engagement features may extend axially through the primary mass in an assembled configuration.

In some variations, at least one of the at least one or more of the engagement features may comprise a friction surface for engaging the secondary mass. The first face of the secondary mass may comprise a corresponding friction surface for engaging the friction surface of the coupling member.

In some variations, the central aperture may have a circular cross-section. This enables the primary and secondary masses of the dual mass flywheel to be axially connected to each another.

In accordance with a second aspect of the disclosure, there is provided a primary mass of a dual mass flywheel, wherein the aforementioned coupling member is attached to a first face of the primary mass of the dual mass flywheel via the fixing point of each of the at least one resiliently deformable members.

In accordance with a third aspect of the disclosure, there is provided a secondary mass of a dual mass flywheel, wherein a first face of the secondary mass flywheel is configured to be engaged by the at least one engagement feature of the aforementioned coupling member.

In accordance with a fourth aspect of the disclosure, there is provided dual mass flywheel assembly, wherein the aforementioned coupling member is attached to a first face of the primary mass of the dual mass flywheel via the fixing point of each of the at least one resiliently deformable members and wherein a first face of the secondary mass flywheel is configured to be engaged by the at least one engagement feature of the aforementioned coupling member.

In accordance with a fifth aspect of the disclosure, there is provided apparatus for selectively coupling a primary mass and a secondary mass of a dual mass flywheel, the apparatus comprising: a coupling member, wherein the coupling member comprises: a central aperture for enabling axial alignment of the primary mass and the secondary mass, and at least one resiliently deformable member, the resiliently deformable member comprising a fixing point attachable to the primary mass to rigidly couple one end of the resiliently deformable member to the primary mass, at least one engagement member configured to engage the secondary mass, and a starter motor pinion configured to move the coupling member relative to the primary and secondary masses.

Such apparatus is relatively simple to make, attach to a dual mass flywheel and operate. In use, the coupling member is attached to a first face (the face that is not opposing the secondary mass) of the primary mass of a dual mass flywheel. In use, the one or more engagement members are received in one or more corresponding channels in the primary mass, such that a first end of the engagement member can engage with a portion of the coupling member and a second end of the engagement member can engage with a first face of the secondary mass. The coupling member may be made of any suitable metal, polymer, composite material or a mix of any of these. Similarly, the one or more engagement members may be made of any suitable metal, polymer, composite material or a mix of any of these. The fixing point may comprise a weld, a rivet and/or any other suitable fixing means.

In use, the resiliently deformable member is arranged such that the coupling member is held away from the face of the primary mass in a starting position. When a starter motor pinion engages with the ring gear to start the engine, the flange of the starter motor pinion impinges on a portion of the coupling member, thereby overcoming the force of the resiliently deformable member and urging at least a part of the coupling member towards the outward face of the primary mass. This in turn causes the coupling member to urge at least one engagement feature through a corresponding channel in the primary mass to engage with a first face of the secondary mass of the dual mass flywheel, thereby coupling the primary and secondary masses of the dual mass flywheel together during the engine start phase. When the starter motor pinion is retracted once the engine has started, the resiliently deformable member urges the coupling member to return back to its starting position. This in turn allows the engagement members to disengage from the first face of the secondary mass, thereby disengaging the primary and secondary masses of the dual mass flywheel. In this way, a simple and inexpensive solution is provided that allows the primary and secondary flywheel masses to be engaged during the engine start phase.

In some variations the at least one engagement member may comprise an energy storing member and wherein the energy storing member is integral to the engagement member. The energy storing member may be a spring. The energy storing member allows the at least one engagement members to disengage from the first face of the secondary mass.

In accordance with a sixth aspect of the disclosure, there is provided a vehicle comprising at least one of the aforementioned coupling members, the aforementioned primary mass, the aforementioned secondary mass, the aforementioned dual mass flywheel assembly and/or the aforementioned apparatus for selectively coupling a primary mass and a secondary mass of a dual mass flywheel.

In accordance with a seventh aspect of the disclosure, there is provided a method for reducing relative movement between a primary mass and a secondary mass of a dual mass flywheel during vehicle start-up, the dual mass flywheel having a coupling member in accordance with the first aspect of the disclosure attached to a first face of the primary mass via the fixing point of each of the at least one resiliently deformable members, the coupling member sized such that an outer portion of the coupling member protrudes beyond an outer edge of the primary mass and wherein the method comprises urging a starter motor pinion in a first pinion direction such that it impinges on the protruding portion of the coupling member, thereby moving a part of the coupling member in a first coupling member direction away from the first face of the primary mass and towards a first face of the secondary mass such that the at least one engagement feature engages with the first face of the secondary mass, thereby engaging the primary mass and the secondary mass.

In some variations, the method may comprise: moving the starter motor pinion in a second pinion direction that opposes the first pinion direction, allowing at least one of the at least one resiliently deformable members to urge the part of the coupling member in a second coupling member direction opposing the first coupling member direction and towards the first face of the primary mass, thereby disengaging the at least one engagement feature from the first face of the secondary mass and thereby disengaging the primary mass and the secondary mass.

In accordance with a eighth aspect of the disclosure, there is provided a method for reducing relative movement between a primary mass and a secondary mass of a dual mass flywheel during vehicle start-up, wherein: the primary mass comprises one or more channels, each channel for receiving an engagement member, the dual mass flywheel has a coupling member in accordance with the fifth aspect attached to a first face of the primary mass via the fixing point of each of the at least one resiliently deformable members, and wherein the method comprises urging a starter motor pinion comprising a flange in a first pinion direction such that the flange impinges on the coupling member, thereby moving a part of the coupling member in a first direction towards the first face of the primary mass and towards a first face of the secondary mass such that an engagement member is urged in the first direction through a channel of the one or more channels and the engagement member engages with the first face of the secondary mass, thereby engaging the primary mass and the secondary mass.

In some variations, the method may comprise: moving the starter motor pinion in a second pinion direction that opposes the first pinion direction allowing at least one of the at least one resiliently deformable members to urge the part of the coupling member in a second coupling member direction opposing the first coupling member direction and towards the first face of the primary mass.

In some variations, the engagement member may be coupled to the coupling member and the urging the part of the coupling member in a second coupling member direction disengages the at least one engagement feature from the first face of the secondary mass, thereby disengaging the primary mass and the secondary mass.

In some variations, the engagement member may comprise an energy storing member and the urging the part of the coupling member in a second coupling member direction allows the energy storing member to disengage the at least one engagement feature from the first face of the secondary mass, thereby disengaging the primary mass and the secondary mass.

BRIEF DESCRIPTION OF THE DRAWINGS

The above and other objects and advantages of the disclosure will be apparent upon consideration of the following detailed description, taken in conjunction with the accompanying drawings, in which.

Figure 1:
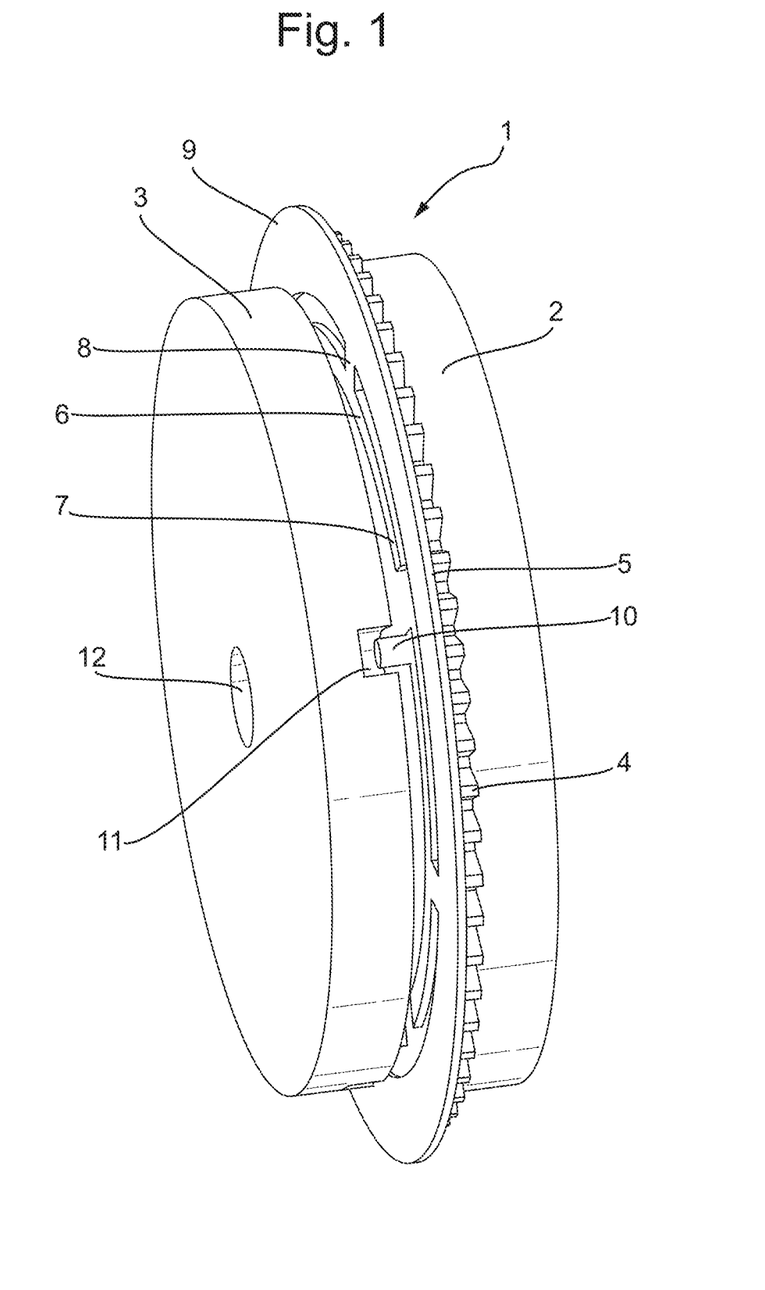
FIG. 1 shows a first example of a coupling member attached to a first face of a primary mass of a dual mass flywheel, in accordance with an example of the disclosure.

FIG. 1 is a schematic diagram of a dual mass flywheel 1 comprising a primary mass 2, a secondary mass 3 and a coupling member 5 for engaging the primary mass 2 with the secondary mass 3. The primary mass 2 comprises a ring gear 4. In use, the pinion of a starter motor engages with the ring gear 4 to turn the primary mass 2. In this example, the coupling member 5 comprises resiliently deformable members 6, and the resiliently deformable members 6 comprise fixing points 7 which are used to fix the coupling member 5 to a first face of the primary mass 2. In use, it is the deformation of resiliently deformable members 6 about the fixing points 7, when the coupling member 5 is urged away from the first face of the primary mass, that stores energy to urge the coupling member 5 back towards the first face of the primary mass 2 when the pinion gear is retracted. In some examples (not shown) there may be a single resiliently deformable member or any other number of resiliently deformable members. In this example, the resiliently deformable member 6 comprises a tab 8 which extends away from the resiliently deformable member 6 and attaches the resiliently deformable member 6 to the outer portion 9 of the coupling member 5. In this example, the resiliently deformable member 6 is located towards the center of the coupling member 5 with respect to the outer portion 9. The coupling member 5 also comprises engagement features in the form of cylindrical protrusions 10, which, in use, engage the secondary mass 3. In this example, the tab 8 is located at the center of the resiliently deformable member 6 such that fixing point 7 and the engagement feature 10 are located the same, or a similar, distance away from the tab 8. However, in other examples the tab may be located off-center, such that either the fixing point 7 or the engagement feature 10 is located closer to the tab. In some examples (not shown) there may be a single engagement feature or any other number of engagement features. The engagement features may comprise any geometric shape, such as a cube, cuboid, cylinder, pyramid, prism or an irregular shape, a non-geometric shape or mix of these shapes (again, not shown). Alternatively, the engagement feature may comprise a friction surface (again, not shown). A first face of the secondary mass 3 comprises receiving portions 11 that receive the engagement features 10. In use, when the receiving portions receive the engagement features, the primary and the secondary masses are engaged such that relative rotational movement between the two masses is reduced or eliminated entirely. In use, the crankshaft of an engine is typically attached to the primary mass 2. In use, when the starter motor pinion disengages from the ring gear 4, the resiliently deformable member causes the coupling member to move away from the first face of the secondary mass 3, thereby causing engagement features to disengage from the secondary mass 3 and thereby disengaging the primary mass 2 and the secondary mass 3.

Figure 2:
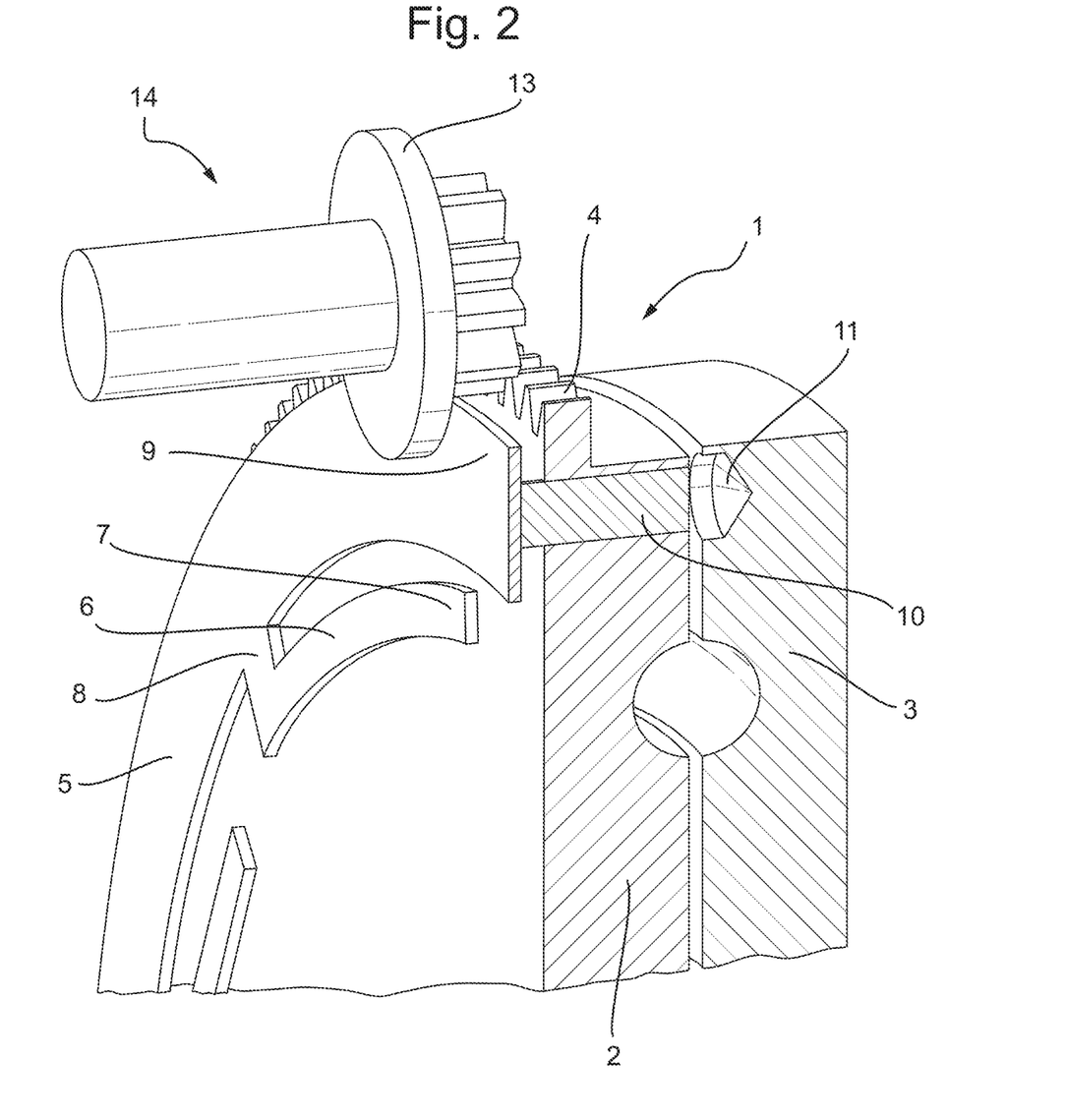
FIG. 2 shows a second example of a coupling member attached to a first face of a primary mass of a dual mass flywheel, in accordance with an example of the disclosure.

FIG. 2 is a schematic diagram of an alternative dual mass flywheel 1 comprising a primary mass 2, a secondary mass 3 and a coupling member 5 for engaging the primary mass 2 with the secondary mass 3. The primary mass 2 comprises a ring gear 4. In use, the pinion of a starter motor engages with the ring gear 4 to turn the primary mass 2. In this example, the coupling member 5 comprises resiliently deformable members 6, and the resiliently deformable members 6 comprise fixing points 7 which are used to fix the coupling member 5 to a first face of the primary mass 2. In use, it is the deformation resiliently deformable members 6 about the fixing points 7, when the coupling member 5 is urged towards the first face of the primary mass, that stores energy to urge the coupling member 5 away from the first face of the primary mass 2 when the pinion gear is retracted. In some examples (not shown) there may be a single resiliently deformable member or any other number of resiliently deformable members. In this example, the resiliently deformable member 6 comprises a tab 8 which attaches the resiliently deformable member to the outer portion 9 of the coupling member 5. Cylindrical members 10 are received in channels or in the primary mass 2. In use, a portion of the coupling member 5 engages with one or more engagement features, in this example cylindrical members 10. When the starter motor pinion 14 engages with the ring gear, the flange 13 of the starter motor pinion 14 engages with a portion of the coupling member 5 and urges the coupling member 5 towards the first face of the primary mass 2. This in turn causes the portion of the coupling member 5 that is engaged with the one or more engagement features to urge the engagement features towards the secondary mass 3. In some examples, the engagement features are attached to the coupling member 5. In other examples, the engagement features 10 are separate to the coupling member 5. In some examples there may be a single engagement feature or any other number of engagement features. The engagement features may comprise any geometric shape, such as a cube, cuboid, cylinder, pyramid, prism or an irregular shape, a non-geometric shape or mix of these shapes (again, not shown). Alternatively, the engagement feature may comprise a friction surface (again, not shown). A first face of the secondary mass 3 comprises receiving portions 11 that receive the engagement features 10. In use, when the receiving portions receive the engagement features, the primary and the secondary masses are engaged such that relative rotational movement between the two masses is reduced or eliminated entirely. When the starter motor pinion 14 disengages from the ring gear 4, the flange 13 is no longer engaged with a portion of the coupling member 5 and the resiliently deformable member causes the coupling member to move away from the first face of the secondary mass 3. Where the engagement features are attached to the coupling member 5, this causes engagement features to disengage from the secondary mass 3, thereby disengaging the primary mass 2 and the secondary mass 3. Where the engagement features comprise an energy storing member, the movement of the coupling member 5 away from the first face of the primary mass 2 creates a gap between the coupling member 5 and the first face of the primary mass 2 for the energy storing member 10 to move into, in a similar manner, this causes engagement features to disengage from the secondary mass 3, thereby disengaging the primary mass 2 and the secondary mass 3.

Figure 3:
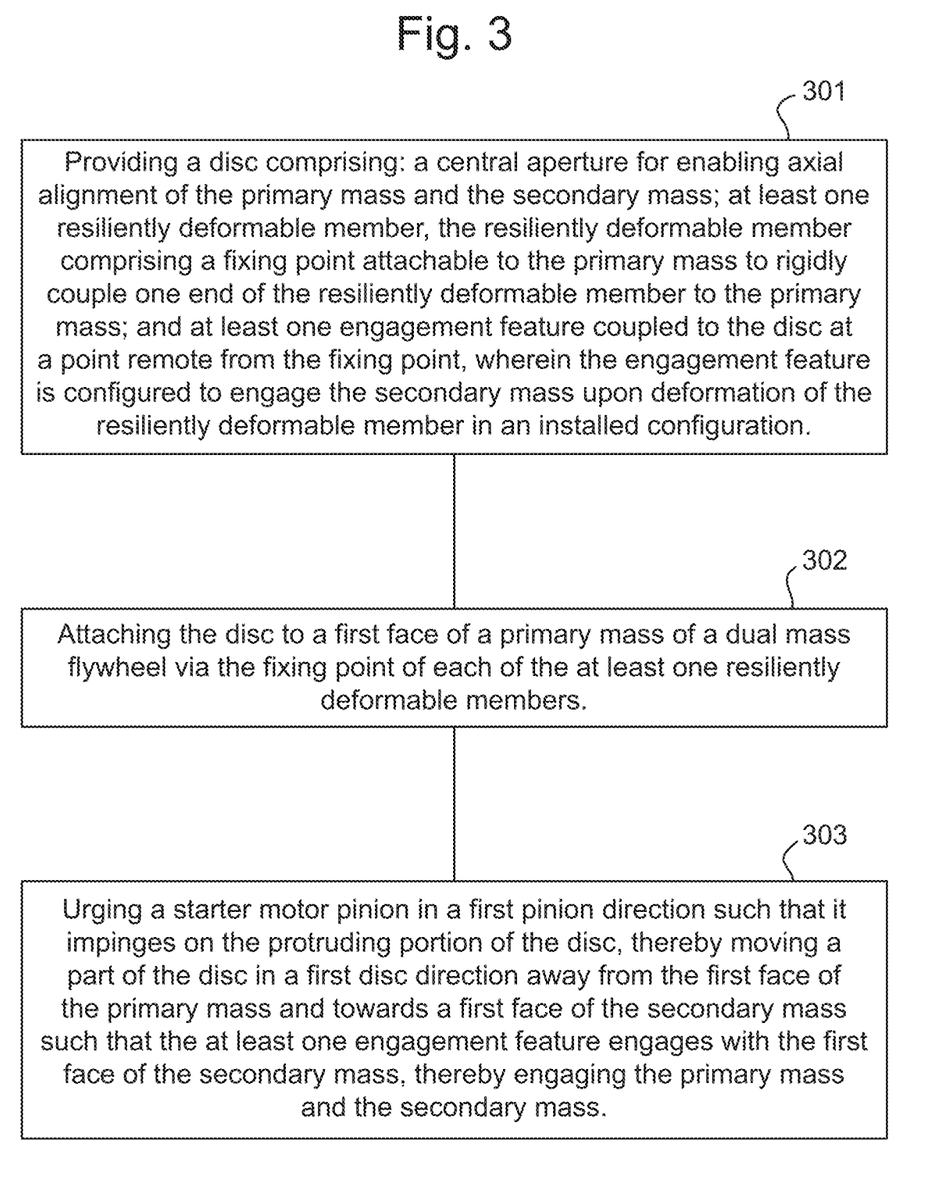
FIG. 3 shows method steps, in accordance with an example of the disclosure.

FIG. 3 describes a method for reducing relative movement between a primary mass and a secondary mass of a dual mass flywheel during vehicle start-up, wherein the method comprises providing a coupling member comprising: a central aperture for enabling axial alignment of the primary mass and the secondary mass, at least one resiliently deformable member, the resiliently deformable member comprising a fixing point attachable to the primary mass to rigidly couple one end of the resiliently deformable member to the primary mass, and at least one engagement feature coupled to the coupling member at a point remote from the fixing point, wherein the engagement feature is configured to engage the secondary mass upon deformation of the resiliently deformable member in an installed configuration 301, attaching the coupling member to a first face of a primary mass of a dual mass flywheel via the fixing point of each of the at least one resiliently deformable members 302 and urging a starter motor pinion in a first pinion direction such that it impinges on the protruding portion of the coupling member, thereby moving a part of the coupling member in a first coupling member direction away from the first face of the primary mass and towards a first face of the secondary mass such that the at least one engagement feature engages with the first face of the secondary mass, thereby engaging the primary mass and the secondary mass 303.

Figure 4:
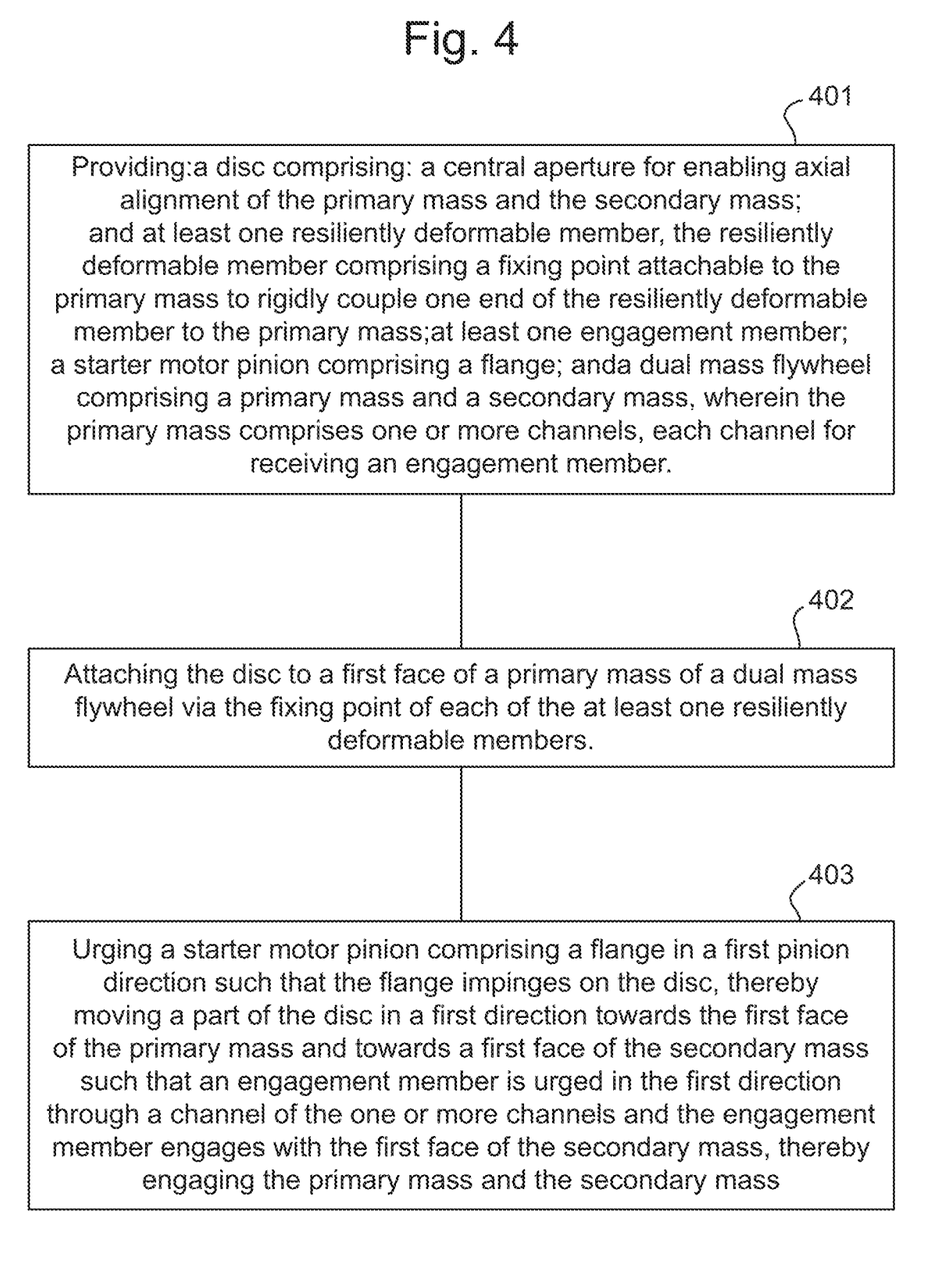
FIG. 4 shows method steps, in accordance with a second example of the disclosure.

FIG. 4 describes another method for reducing relative movement between a primary mass and a secondary mass of a dual mass flywheel during vehicle start-up, wherein the method comprises providing: a coupling member comprising: a central aperture for enabling axial alignment of the primary mass and the secondary mass, and at least one resiliently deformable member, the resiliently deformable member comprising a fixing point attachable to the primary mass to rigidly couple one end of the resiliently deformable member to the primary mass, at least one engagement member, a starter motor pinion comprising a flange, and a dual mass flywheel comprising a primary mass and a secondary mass, wherein the primary mass comprises one or more channels, each channel for receiving an engagement member 401, attaching the coupling member to a first face of a primary mass of a dual mass flywheel via the fixing point of each of the at least one resiliently deformable members 402 and urging a starter motor pinion comprising a flange in a first pinion direction such that the flange impinges on the coupling member, thereby moving a part of the coupling member in a first direction towards the first face of the primary mass and towards a first face of the secondary mass such that an engagement member is urged in the first direction through a channel of the one or more channels and the engagement member engages with the first face of the secondary mass, thereby engaging the primary mass and the secondary mass 403.

Figure 5:
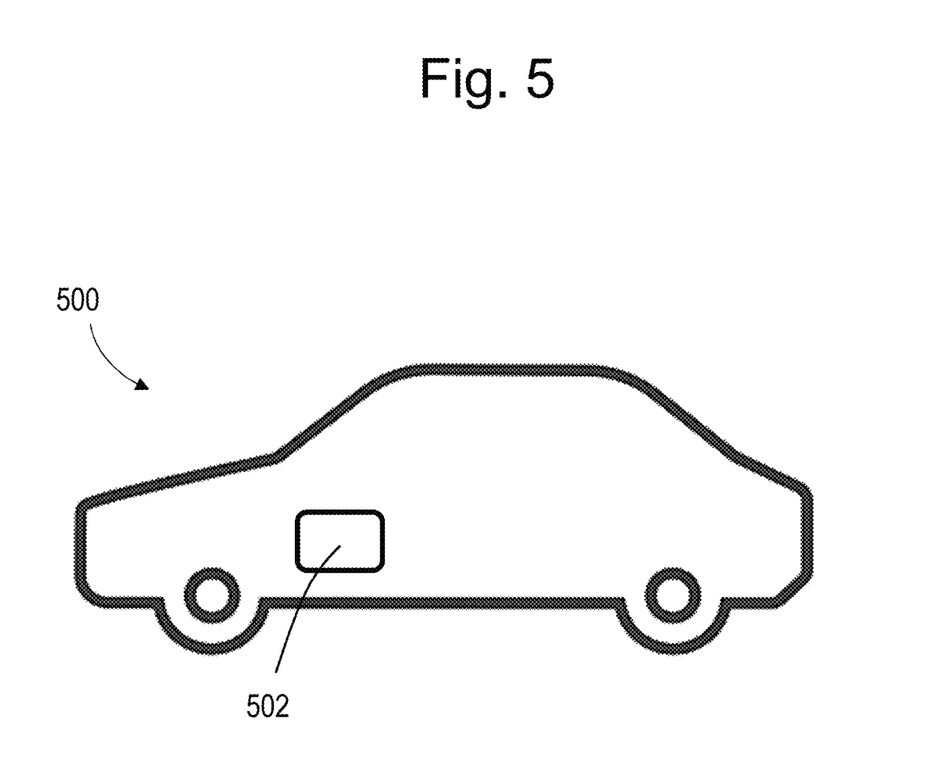
FIG. 5 shows a schematic diagram of a vehicle with a dual mass flywheel coupling member for selectively coupling a primary mass and a secondary mass of a dual mass flywheel, in accordance with an example of the disclosure.

FIG. 5 is a schematic diagram of a vehicle 500 with a dual mass flywheel coupling member 502 for selectively coupling a primary mass and a secondary mass of a dual mass flywheel, e.g., using the above described system and/or apparatus. The dual mass flywheel coupling member 502 may be used to selectively lock together the primary and secondary masses of the dual mass flywheel of the vehicle, e.g., during a start phase of the vehicle's engine. In some examples, the coupling member 502 is fixed to the primary mass of the dual mass flywheel and engaged with the secondary mass of the dual mass flywheel whilst a starter motor of the vehicle is cranking the primary mass. Once the engine has been started, the coupling member 502 remains fixed to the primary mass of the dual mass flywheel and becomes disengaged from the secondary mass of the dual mass flywheel.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A dual mass flywheel coupling member for selectively coupling a primary flywheel and a secondary flywheel of a dual mass flywheel, the coupling member comprising:
   a central aperture for enabling axial alignment with the primary flywheel and the secondary flywheel;
   at least one resiliently deformable member, the resiliently deformable member comprising:
      a fixing point attachable to the primary flywheel to rigidly couple one end of the resiliently deformable member to the primary flywheel; and
      a tab that extends away from the resiliently deformable member and attaches the resiliently deformable member to an outer portion of the coupling member; and
   at least one engagement feature coupled to the coupling member at a point remote from the fixing point, wherein the engagement feature is configured to engage the secondary flywheel upon deformation of the resiliently deformable member, in an installed configuration.

2. The coupling member of claim 1, wherein deformation of the resiliently deformable member causes the engagement feature to be urged away from the secondary flywheel, in an installed configuration.

3. The coupling member of claim 1, wherein at least one of the at least one engagement features comprises a protrusion for engaging the secondary flywheel.

4. The coupling member of claim 3, wherein the protrusion is a geometric shape.

5. The coupling member of claim 3, wherein the protrusion is an irregular shape.

6. The coupling member of claim 1, wherein the protrusion is cylindrical.

7. The coupling member of claim 1, wherein at least one of the at least one engagement features extends axially through the primary flywheel, in an assembled configuration.

8. The coupling member of claim 1, wherein at least one of the at least one or more of the engagement features comprises a friction surface for engaging the secondary flywheel.

9. The coupling member of claim 1, wherein the central aperture is circular.

10. The coupling member of claim 1, wherein the resiliently deformable member is located towards a center of the coupling member with respect to the outer portion.

11. The coupling member of claim 1, wherein the outer portion of the coupling member is circular.

12. A primary flywheel of a dual mass flywheel, wherein the coupling member of claim 1 is attached to a first face of the primary flywheel of the dual mass flywheel via the fixing point of each of the at least one resiliently deformable members.

13. The primary flywheel of a dual mass flywheel of claim 12, wherein the primary flywheel comprises a ring gear.

14. A secondary flywheel of a dual mass flywheel, wherein a first face of the secondary flywheel is configured to be engaged by the at least one engagement feature of the coupling member of claim 1.

15. A dual mass flywheel assembly comprising the coupling member of claim 1, wherein the coupling member is attached to a first face of the primary flywheel of the dual mass flywheel via the fixing point of each of the at least one resiliently deformable members and wherein a first face of the secondary flywheel is configured to be engaged by the at least one engagement feature of the coupling member.

16. A vehicle comprising at least one coupling member of claim 1.

17. The vehicle of claim 16, wherein:
   the primary flywheel comprises a ring gear; and
   the vehicle further comprises:
      a starter motor; and
      a retractable starter motor pinion gear comprising a flange.

18. A method for reducing relative movement between a primary flywheel and a secondary flywheel of a dual mass flywheel during vehicle start-up, the dual mass flywheel having the coupling member of claim 1 attached to a first face of the primary flywheel via the fixing point of each of the at least one resiliently deformable members, and wherein the method comprises urging a starter motor pinion in a first pinion direction such that it impinges on the protruding portion of the coupling member, thereby moving a part of the coupling member in a first coupling member direction away from the first face of the primary flywheel and towards a first face of the secondary flywheel such that the at least one engagement feature engages with the first face of the secondary flywheel, thereby engaging the primary flywheel and the secondary flywheel.

19. The method of claim 18 further comprising:
   moving the starter motor pinion in a second pinion direction that opposes the first pinion direction; and
   allowing at least one of the at least one resiliently deformable members to urge the part of the coupling member in a second coupling member direction opposing the first coupling member direction and towards the first face of the primary flywheel, thereby disengaging the at least one engagement feature from the first face of the secondary flywheel and thereby disengaging the primary flywheel and the secondary flywheel.

* * * * *